(12) United States Patent
Eder et al.

(10) Patent No.: US 9,382,594 B2
(45) Date of Patent: Jul. 5, 2016

(54) PROCESS AND APPARATUS FOR PRODUCING PRESSED ARTICLES

(75) Inventors: Thomas Eder, Traun (AT); Robert Millner, Loosdorf (AT); Jan-Friedemann Plaul, Linz (AT); Norbert Rein, Vienna (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 928 days.

(21) Appl. No.: 13/582,733

(22) PCT Filed: Feb. 18, 2011

(86) PCT No.: PCT/EP2011/052383
§ 371 (c)(1),
(2), (4) Date: Sep. 4, 2012

(87) PCT Pub. No.: WO2011/107349
PCT Pub. Date: Sep. 9, 2011

(65) Prior Publication Data
US 2012/0328465 A1  Dec. 27, 2012

(30) Foreign Application Priority Data
Mar. 4, 2010 (AT) .................................. A 350/2010

(51) Int. Cl.
*B22F 3/02* (2006.01)
*C21B 13/00* (2006.01)

(52) U.S. Cl.
CPC ......... *C21B 13/0033* (2013.01); *C21B 13/0046* (2013.01); *Y02P 10/136* (2015.11)

(58) Field of Classification Search
CPC ........................ C21B 13/0033; C21B 13/0026
USPC .......................................................... 266/176
See application file for complete search history.

(56) References Cited

U.S. PATENT DOCUMENTS

| 5,192,486 A | 3/1993 | Whipp ........................ 266/156 |
| 5,674,308 A | 10/1997 | Meissner et al. ................ 75/450 |
| 6,030,434 A | 2/2000 | Machado Zuloaga et al. . 75/770 |

(Continued)

FOREIGN PATENT DOCUMENTS

| CN | 101578378 A | 11/2009 | ............. C21B 13/00 |
| DE | 19637180 A1 | 3/1997 | ............. C21B 13/00 |

(Continued)

OTHER PUBLICATIONS

International Search Report and Written Opinion, Application No. PCT/EP2011/052383, 12 pages, May 20, 2011.

(Continued)

*Primary Examiner* — Scott Kastler
(74) *Attorney, Agent, or Firm* — Ostrolenk Faber LLP (57) ABSTRACT

A method is provided for producing pressed articles which contain direct-reduced, fine particulate iron (direct reduced iron, DRI) from a fluidized bed reduction system for direct reduction of fine particulate iron ore, wherein direct-reduced, fine particulate iron produced in the fluidized bed reduction system during direct reduction is compacted into pressed articles. Dry, fine particulate material containing at least fine particulate iron ore and optionally fine particulate iron and carbon is admixed to the direct-reduced fine particulate iron and the mixture thus obtained is subsequently compacted into pressed articles. An apparatus for carrying out such method is also provided.

10 Claims, 3 Drawing Sheets

(56) References Cited

U.S. PATENT DOCUMENTS

| | | | |
|---|---|---|---|
| 6,277,324 B1 | 8/2001 | Joo et al. ................... | 266/142 |
| 8,945,273 B2 * | 2/2015 | Eder ................... | C21B 13/00 75/376 |
| 2012/0328465 A1 | 12/2012 | Eder et al. ................... | 419/66 |

FOREIGN PATENT DOCUMENTS

| | | |
|---|---|---|
| RU | 2260624 C2 | 9/2005 |
| RU | 2354721 C2 | 5/2009 |
| UA | 5822 | 3/2005 |
| UA | 38785 U | 1/2009 |
| WO | 03/056039 A1 | 7/2003 ............. C21B 11/00 |
| WO | WO 03/056039 A1 | 7/2003 |
| WO | 2008/078937 A1 | 7/2008 ............. C21B 13/00 |
| WO | 2008/078938 A1 | 7/2008 ............. C21B 13/06 |
| WO | 2011/107349 A1 | 9/2011 ............. C21B 13/00 |

OTHER PUBLICATIONS

Russian Federation Decision on Grant, dated Jan. 28, 2015, issued in corresponding Russian Patent Application No. 2012142173/02(067881). 7 pages.

* cited by examiner

PROCESS AND APPARATUS FOR PRODUCING PRESSED ARTICLES

CROSS-REFERENCE TO RELATED APPLICATIONS

This application is a U.S. National Stage Application of International Application No. PCT/EP2011/052383 filed Feb. 18, 2011, which designates the United States of America, and claims priority to AT Patent Application No. A350/2010 filed Mar. 4, 2010. The contents of which are hereby incorporated by reference in their entirety.

TECHNICAL FIELD

The present disclosure relates to a process for producing pressed articles containing finely particulate direct reduced iron (DRI) from a fluidized bed reduction system for the direct reduction of finely particulate iron ore, and also to an apparatus for carrying out the process.

BACKGROUND

One method for the direct reduction of iron ore by means of a reducing gas is based on reducing finely particulate iron ore having a grain size of 0.005 to 12 mm in a fluidized bed. The fluidized bed is obtained by injecting reducing gas into the finely particulate iron ore in a fluidized bed reactor in a fluidized bed reduction system. The finely particulate iron ore is held in suspension by the stream of gas and reacts with the reducing gas, in which case it itself is reduced and the reducing gas is oxidized. After a certain residence time in the fluidized bed reactor, the thus reduced finely particulate material is removed. It is known to reduce the finely particulate iron ore in a cascade of a plurality of fluidized bed reactors by reducing gas. By way of example, in the FINEX® process or in the FINMET® process, the finely particulate iron ore is conducted in countercurrent to a stream of reducing gas through a cascade of a plurality of fluidized bed reactors.

The material which is removed from the last fluidized bed reactor, as seen in the direction of flow of the finely particulate iron ore, and which is largely reduced is usually subjected to a final reduction step or melt-down step for producing pig iron. This material is also referred to as finely particulate direct reduced iron (DRI). Such a final reduction step or melt-down step is carried out in a melter gasifier, for example. In such a melter gasifier, a reducing gas is produced from carbon carriers and oxygen by gasification reactions, pre-reduced iron carriers—for example precisely the largely reduced material DRI removed from the last fluidized bed reactor—are subjected to a final reduction and also the pig iron produced in the process is melted down. The final reduction step or melt-down step can also take place, however, in a type of melt reduction system which differs from a melter gasifier, or for example in a blast furnace.

The DRI can also be used, however, as an iron carrier for another application, for example for steelworks for instance in arc furnaces or converters.

To ensure an efficient procedure, iron carriers intended for use in a melter gasifier should have a grain size distribution which avoids firstly the negative effects associated with excessively small grain sizes of the iron carriers—such as nonuniform gas distribution in the melter gasifier—and secondly the negative effects on the melter gasifier operation associated with excessively large grain sizes of the iron carriers—such as delayed melt-down behavior and increased proportion of direct reduction, and as a consequence thereof also higher levels of reducing agent consumption. In order for it to be possible to use the finely particulate material DRI removed from the last fluidized bed reactor in the melter gasifier as an iron carrier, it is processed, for example by compacting, to form pressed articles. To this end, the material DRI removed from the last fluidized bed reactor is initially fed to a collection tank, also referred to as a DRI fines bunker, and from there is fed to a compacting system. Since the DRI is obtained in finely particulate form, use is made of the term DRI fines bunker within the context of the present application, where the part fines is present in this term on account of the finely particulate size of the DRI. The collection tank—or DRI fines bunker—is required during operation in order to be able to offset brief system disruptions, which can occur upon pneumatic conveying between the last fluidized bed reactor and the collection tank—or DRI fines bunker; the collection tank—or DRI fines bunker—acts in this case as a buffer store for the material feed of DRI in system parts arranged downstream thereof.

When DRI is used as an iron carrier in a blast furnace or steelworks, too, the DRI is compacted.

In fluidized bed reduction processes, spent reducing gas, i.e. reducing gas used for the reduction reaction, is generally removed from the last fluidized bed reactor, as seen in the direction of flow thereof, and discharged as so-called off-gas. Since it has indeed passed through one or more fluidized bed reactors with finely particulate iron ore, the off-gas entrains finely particulate material containing, inter alia, finely particulate iron oxide from the iron ore and also finely particulate iron formed during the reduction and some carbon. To separate this dust load, the off-gas is dedusted, for example by means of a dry dedusting apparatus, for instance a filter apparatus, by means of bag filters or ceramic filters or by means of a cyclone. The separated material, which in the case of dry dedusting is a dry dust containing iron oxide, has—particularly since it indeed contains not only iron oxide but also material already reduced to form iron—a high iron content and carbon content, and therefore for economical reasons should be used as an iron carrier raw material—for example in pig iron production in a melter gasifier or blast furnace, or in steelworks. It should be used preferably in pig iron production processes associated with the fluidized bed reactors in which it was formed. However, since the separated material is significantly finer than the finely particulate material fed to the fluidized bed reactors, and it is even too fine to be added, for example, to the melter gasifier, its economic use provides difficulties.

If a fluidized bed reduction system is shut down, the fluidized bed reactors have to be emptied in order to avoid passage of the material present therein through the distributor bases and agglomeration and also clumping. Just as in the dry dedusting apparatuses for off-gas, finely particulate material is obtained in this case, containing, inter alia, finely particulate iron oxide from the iron ore and also finely particulate iron formed during the reduction and carbon. This material, too, should be supplied for use as an iron carrier raw material, for example in pig iron production in a melter gasifier or blast furnace, or in steelworks.

The use of such finely particulate materials by addition into the fluidized bed reactors is not possible, since the finely particulate materials would to a large extent be blown immediately back out of the fluidized beds, because in terms of size they lie predominantly below or in the region of the separation size of the cyclone present in the fluidized bed reactors.

The use of the finely particulate materials in dust burners for introduction into a melter gasifier is unfavorable on account of the excessively small carbon content for dust burners, because in this respect it would be necessary to use additional energy carriers, for example in the form of coal or fuel gas.

SUMMARY

In one embodiment, a process is provided for producing pressed articles which contain finely particulate direct reduced iron from a fluidized bed reduction system for the direct reduction of finely particulate iron ore, wherein finely particulate direct reduced iron produced in the fluidized bed reduction system during the direct reduction is compacted to form pressed articles, wherein dry finely particulate material containing at least finely particulate iron oxide and also if appropriate finely particulate iron and carbon is admixed to the finely particulate direct reduced iron, and the mixture thus obtained is subsequently compacted to form the pressed articles.

In a further embodiment, the dry finely particulate material originates from dry dedusting of the off-gas from the fluidized bed reduction system. In a further embodiment, the dry finely particulate material is obtained by removing finely particulate direct reduced material from fluidized bed reactors in the fluidized bed reduction system before system shutdown. In a further embodiment, the dry finely particulate material originates from a fine ore drying system which may be assigned to the fluidized bed reduction system in a system assembly. In a further embodiment, the dry finely particulate material originates from a dedusting device of a material conveying apparatus which may be assigned to the fluidized bed reduction system in a system assembly. In a further embodiment, the quantitative proportion of the dry finely particulate material in the mixture has a lower limit of 0.25% by weight, e.g., of 0.5% by weight, and the quantitative proportion is up to 10% by weight, e.g., up to 5% by weight.

In another embodiment, an apparatus is provided for carrying out any of the processes disclosed above, the apparatus having a fluidized bed reduction system which comprises at least one fluidized bed reactor for the direct reduction of finely particulate iron ore, a collection tank for receiving finely particulate direct reduced iron produced in the fluidized bed reduction system, a transfer line for transferring the finely particulate direct reduced iron produced in the fluidized bed reduction system into the collection tank, a compacting system for compacting finely particulate material, and a feed line for feeding finely particulate direct reduced iron from the collection tank into the compacting system, wherein one or more dust feed lines for feeding dry finely particulate material containing at least finely particulate iron oxide and also if appropriate finely particulate iron and carbon issue into the collection tank for collecting finely particulate direct reduced iron and/or into the feed line.

In a further embodiment, an off-gas line for discharging off-gas emanates from at least one fluidized bed reactor in the fluidized bed reduction system, wherein a dry dedusting apparatus for the stream of gas guided in the off-gas line is present in the off-gas line, wherein at least one of the one or more dust feed lines emanates from the dry dedusting apparatus. In a further embodiment, a withdrawal line emanates in each case from the fluidized bed reactors in the fluidized bed reduction system for withdrawing finely particulate direct reduced material present in the respective fluidized bed reactor, e.g., before shutdown of the fluidized bed reduction system, wherein at least one of the one or more dust feed lines originates in at least one of the withdrawal lines. In a further embodiment, there is a dust feed line which issues into the collection tank and/or the feed line and which proceeds from a fine ore drying system—which may be assigned to the fluidized bed reduction system in a system assembly. In a further embodiment, there is a dust feed line which issues into the collection tank and/or the feed line and which proceeds from a dedusting device of a material conveying apparatus—which itself may be assigned to the fluidized bed reduction system in a system assembly.

BRIEF DESCRIPTION OF THE DRAWINGS

Example embodiments will be explained in more detail below with reference to figures, in which.

DETAILED DESCRIPTION

Some embodiments provide a process which makes the simple, economically advantageous use of finely particulate materials as an iron carrier raw material possible, where these finely particulate materials are obtained in a fluidized bed reduction system for the direct reduction of finely particulate iron ore and contain finely particulate iron oxide and also if appropriate finely particulate iron and carbon, and have a particle size which is too small for use in the fluidized bed reactors. They may be used within the context of pig iron production processes associated with the fluidized bed reduction systems.

One example embodiment provides a process for producing pressed articles which contain finely particulate direct reduced iron (DRI) from a fluidized bed reduction system for the direct reduction of finely particulate iron ore, wherein finely particulate direct reduced iron (DRI) produced in the fluidized bed reduction system during the direct reduction is compacted to form pressed articles, wherein dry finely particulate material containing at least finely particulate iron oxide and also if appropriate finely particulate iron and carbon is admixed to the finely particulate direct reduced iron (DRI), and the mixture thus obtained is subsequently compacted to form the pressed articles.

By feeding the dry finely particulate material to the DRI, pressed articles containing this material are obtained from the mixture which is formed. The constituents of the dry finely particulate material are made available in the pressed articles for further uses as an iron carrier raw material—for example for pig iron production—which demand the use of material which is coarser than the dry finely particulate material.

If DRI is compacted, the product is also referred to as hot compacted iron (HCI). In accordance with such a nomenclature, the pressed articles according to embodiments disclosed herein thus contain hot compacted iron.

The dry finely particulate material contains at least iron oxide. In this case, iron oxide with any oxidation stage of the iron is encompassed by the term iron oxide; it may therefore be, for example, FeO or $Fe_2O_3$ or $Fe_3O_4$ or other iron oxides, or mixtures of various iron oxides. The iron oxide can in this case originate from the iron ore reduced in the fluidized bed reduction system.

The dry finely particulate material can also contain finely particulate iron, and it can also contain finely particulate carbon. The finely particulate iron can in this case originate from the reduction of the finely particulate iron ore in the fluidized bed reduction system.

According to one embodiment of the process, the dry finely particulate material originates from dry dedusting of the off-gas from the fluidized bed reduction system.

The spent reducing gas taken from the last fluidized bed reactor in a fluidized bed reduction system, as seen in the direction of flow of the reducing gas, is referred to as off-gas.

According to another embodiment of the process, the dry finely particulate material is obtained by removing finely particulate direct reduced material from fluidized bed reactors in the fluidized bed reduction system before system shutdown.

According to another embodiment of the process, the dry finely particulate material originates from a fine ore drying system, for example a fluidized bed drying system, which may be assigned to the fluidized bed reduction system in a system assembly.

According to another embodiment of the process, the dry finely particulate material originates from a dedusting device of a material conveying apparatus which may be assigned to the fluidized bed reduction system in a system assembly.

Mixed forms of these embodiments are also possible.

In some embodiments, the quantitative proportion of the dry finely particulate material in the mixture has a lower limit of 0.25% by weight, e.g., of 0.5% by weight, and the quantitative proportion is up to 10% by weight, e.g., up to 5% by weight. Here, the limit values of the ranges which are indicated are included. The appropriate limitation is given by an unfavorable product quality, such as for example a low density and increased susceptibility of the pressed articles to disintegration.

Other embodiments provide an apparatus for carrying out the process steps discussed above, the apparatus having a fluidized bed reduction system which comprises at least one fluidized bed reactor for the direct reduction of finely particulate iron ore, a collection tank for receiving finely particulate direct reduced iron (DRI) produced in the fluidized bed reduction system, a transfer line for transferring the finely particulate direct reduced iron (DRI) produced in the fluidized bed reduction system into the collection tank, a compacting system for compacting finely particulate material, and a feed line for feeding finely particulate direct reduced iron (DRI) from the collection tank into the compacting system, wherein one or more dust feed lines for feeding dry finely particulate material containing at least finely particulate iron oxide and also if appropriate finely particulate iron and carbon issue into the collection tank for collecting finely particulate direct reduced iron (DRI) and/or into the feed line.

According to one embodiment, dry finely particulate material containing at least finely particulate iron oxide and also if appropriate finely particulate iron and carbon is fed pneumatically. Since the material is present in dry form, it can be conveyed by means of a pneumatic conveying system without the risk of blockage.

According to further embodiments, the material can be fed by means of bucket mechanisms, scraper conveyors or by means of gravity.

According to one embodiment, an off-gas line for discharging spent reducing gas—referred to as off-gas—emanates from at least one fluidized bed reactor in the fluidized bed reduction system, wherein a dry dedusting apparatus for the stream of gas guided in the off-gas line is present in the off-gas line, wherein at least one of the one or more dust feed lines emanates from the dry dedusting apparatus.

The dry dedusting apparatus may be equipped with ceramic and/or metallic filter candles and/or with bag filters and/or with one or more cyclones. Depending on which temperature the dry dedusting apparatus can withstand without damage, an apparatus for cooling the off-gas is arranged in the off-gas line upstream of the dry dedusting apparatus, as seen in the direction of flow of the off-gas.

The off-gas can thereby be cooled when required to a temperature which is harmless for the dry dedusting apparatus.

According to a further embodiment, a withdrawal line emanates in each case from the fluidized bed reactors in the fluidized bed reduction system for withdrawing finely particulate direct reduced material present in the respective fluidized bed reactor—e.g., before shutdown of the fluidized bed reduction system, wherein at least one of the one or more dust feed lines originates in at least one of the withdrawal lines.

The DRI fines bunker is provided with a gas outlet through which, by way of example, the gas used for pneumatic conveying in a pneumatically operated dust feed line for feeding dry material containing iron oxide into the collection tank for collecting finely particulate direct reduced iron (DRI)—for example nitrogen or other inert conveying gases—or gas which has passed into the DRI fines bunker with DRI supplied from the last fluidized bed reactor is discharged from the DRI fines bunker.

Gas to be discharged from the DRI fines bunker, so-called vent gas, entrains a considerable amount of dust, since on the one hand the contents of the DRI fines bunker are finely particulate, and on the other hand ever smaller particles are formed when DRI is supplied from the last fluidized bed reactor into the DRI fines bunker as a result of the particles rubbing against one another—which of course also applies for the particles of the dry finely particulate material fed to the DRI fines bunker as they are being fed into the DRI fines bunker. For the purpose of dedusting the vent gas, a dedusting apparatus, e.g., a dry dedusting apparatus, may be provided. This is arranged still within the DRI fines bunker in such a way that the dedusting is effected before the vent gas enters the gas outlet.

Alternatively, it is arranged in the gas outlet. In this case, the dry dedusting apparatus can be arranged in the gas outlet, by way of example, laterally alongside the DRI fines bunker, or above or below the DRI fines bunker. The dry finely particulate material separated from the vent gas in the dry dedusting apparatus may be added into the feed line for feeding finely particulate direct reduced iron (DRI) from the collection tank into the compacting system. Accordingly, in an appropriate embodiment, there is a dust feed line which proceeds from the dry dedusting apparatus in the gas outlet and issues into the feed line.

The dry dedusting apparatus may be equipped with ceramic and/or metallic filter candles and/or with bag filters and/or with one or more cyclones.

According to another embodiment, there is a dust feed line which issues into the collection tank and/or the feed line and which proceeds from a fine ore drying system, for example a fluidized bed drying system—which may be assigned to the fluidized bed reduction system in a system assembly.

According to another embodiment, there is a dust feed line which issues into the collection tank and/or the feed line and which proceeds from a dedusting device of a material conveying apparatus—which itself may be assigned to the fluidized bed reduction system in a system assembly.

The pressed articles produced as disclosed herein can be used, for example as described, as iron carriers for a melt reduction system, such as for example a melter gasifier. They can also be used as iron carriers for a blast furnace. They can also be used as iron carriers for steelworks, for example for arc furnaces or converters.

Figure 1:
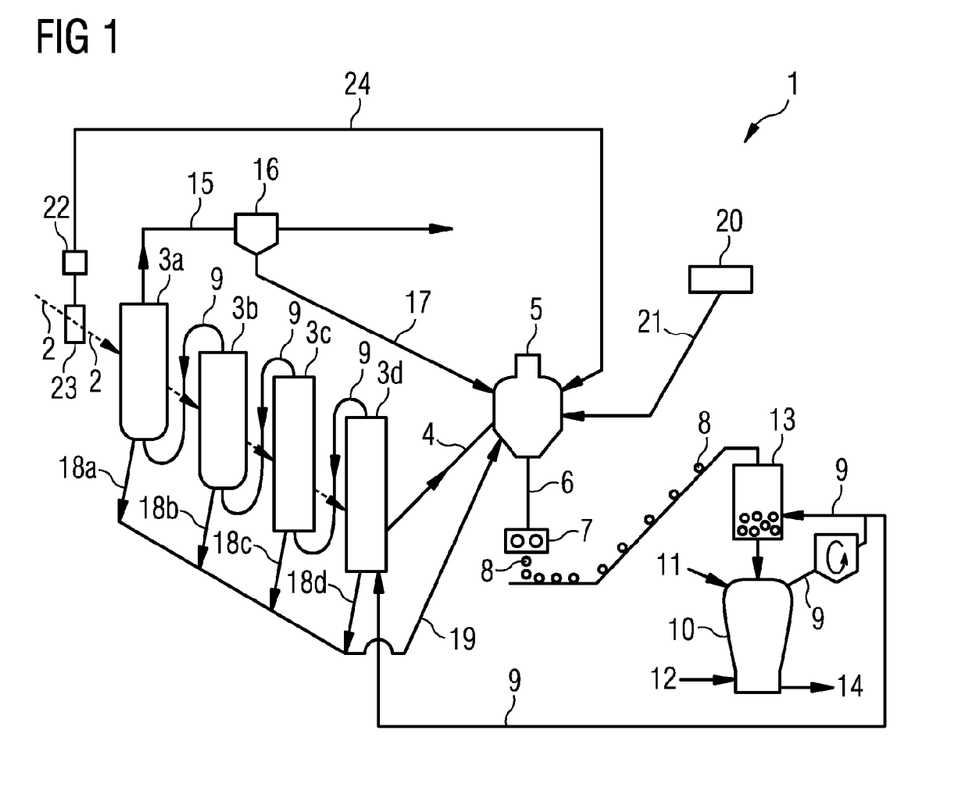
FIG. 1 is a schematic illustration of a fluidized bed reduction system for the direct reduction of finely particulate iron ore, in which the pressed articles are fed to a shaft reactor, according to an example embodiment.

The fluidized bed reduction system 1 for the direct reduction of finely particulate iron ore 2 as shown in FIG. 1 comprises four fluidized bed reactors 3a, 3b, 3c, 3d connected in series. Finely particulate iron ore 2 is introduced into the fluidized bed reactor 3a and passes through the series of fluidized bed reactors in the direction toward the fluidized bed reactor 3d, as shown by dashed arrows. The finely particulate direct reduced iron (DRI) produced in the series of fluidized bed reactors is transferred from the fluidized bed reactor 3d into a collection tank 5 via a pneumatically operated transfer line 4. The finely particulate direct reduced iron (DRI) is fed from the collection tank 5 via a feed line 6 to a compacting system 7 for compacting finely particulate material. In the compacting system 7, pressed articles 8 are produced from the DRI. These are fed to the shaft reactor 13, where they are pre-reduced.

Reducing gas 9 is obtained by gasifying carbon carriers 11 with the supply of oxygen 12 in a melter gasifier 10. Furthermore, iron-containing material which is pre-reduced in the melter gasifier 10 is reduced out from the shaft reactor 13 and melted. The pig iron 14 thus obtained is removed from the melter gasifier 10. The reducing gas 9 is fed in part into the series of fluidized bed reactors 3a, 3b, 3c, 3d and in part into the shaft reactor 13. The reducing gas 9 passes through the fluidized bed reactors 3a, 3b, 3c, 3d in the direction from fluidized bed reactor 3d toward fluidized bed reactor 3a. Spent reducing gas, referred to as off-gas, is discharged from the fluidized bed reactor 3a through the off-gas line 15.

A dry dedusting apparatus 16 for dedusting the stream of gas guided in the off-gas line of off-gas is present in the off-gas line 15, and in this case comprises ceramic filter candles. In this case, dry finely particulate material is obtained in the dry dedusting apparatus 16. A dust feed line 17 for feeding dry finely particulate material from the dry dedusting apparatus 16 into the collection tank 5 emanates from the dry dedusting apparatus 16. The material is fed pneumatically.

A withdrawal line 18a, 18b, 18c, 18d emanates in each case from each of the fluidized bed reactors 3a, 3b, 3c, 3d for withdrawing dry finely particulate direct reduced material present in the respective fluidized bed reactor upon shutdown of the fluidized bed reduction system. A dust feed line 19 for feeding dry finely particulate material from the withdrawal lines into the collection tank 5 originates in each of the withdrawal lines. The material is fed pneumatically.

Dry finely particulate material which forms in a fine ore drying system 20, which is assigned to the fluidized bed reduction system 1 in a system assembly, is fed to the collection tank 5 via the dust feed line 21.

Dry finely particulate material which forms in a dedusting system 22 of a material conveying apparatus 23, which is assigned to the fluidized bed reduction system 1 in a system assembly, is fed to the collection tank 5 via the dust feed line 24.

For reasons of clarity, parts of the fluidized bed reduction system 1 which relate to the continuation and further treatment of the off-gas have not been shown, and also other system details have not been provided, such as for example a cooling gas circuit for the reducing gas 9.

Figure 2:
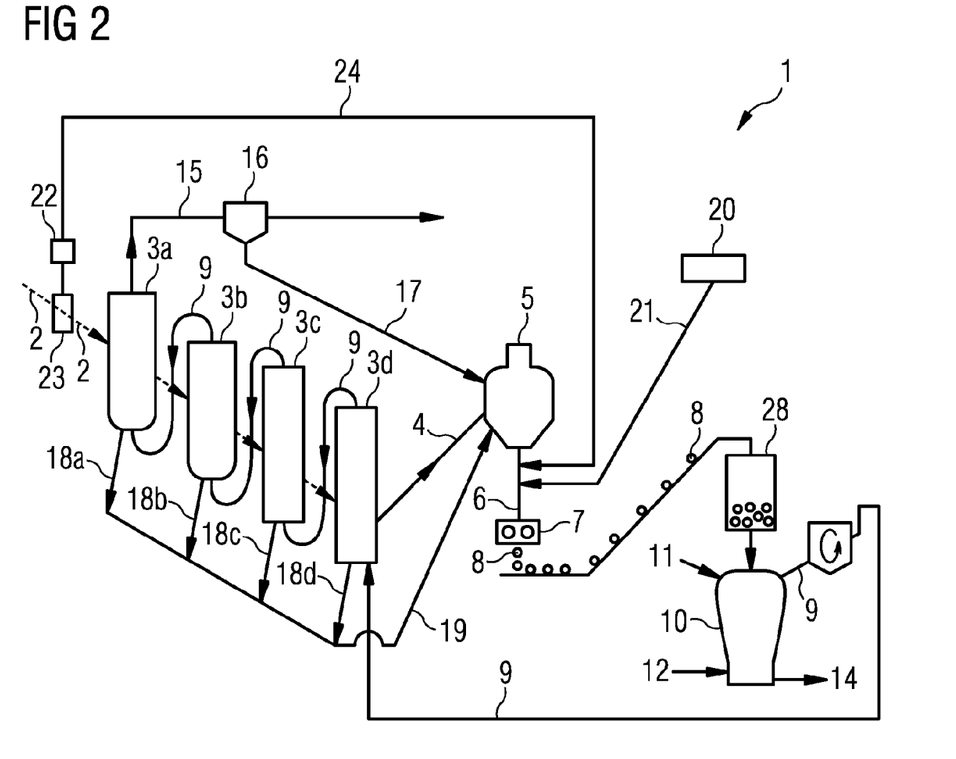
FIG. 2 is a schematic illustration of a fluidized bed reduction system for the direct reduction of finely particulate iron ore, in which the pressed articles are fed to a charging apparatus for charging into a melter gasifier, according to an example embodiment.

FIG. 2 shows a modification of the fluidized bed reduction system shown in FIG. 1. The difference in relation to FIG. 1 is that the pressed articles 8 are not fed to a shaft reactor, but rather to a charging apparatus 28 for charging into a melter gasifier 10. The pressed articles 8 are introduced from the charging apparatus 28 into the melter gasifier. The reducing gas 9 is not fed to the charging apparatus 28. In addition, the dust feed line 24 and the dust feed line 21 issue into the feed line, and not into the collection tank 5.

Figure 3:
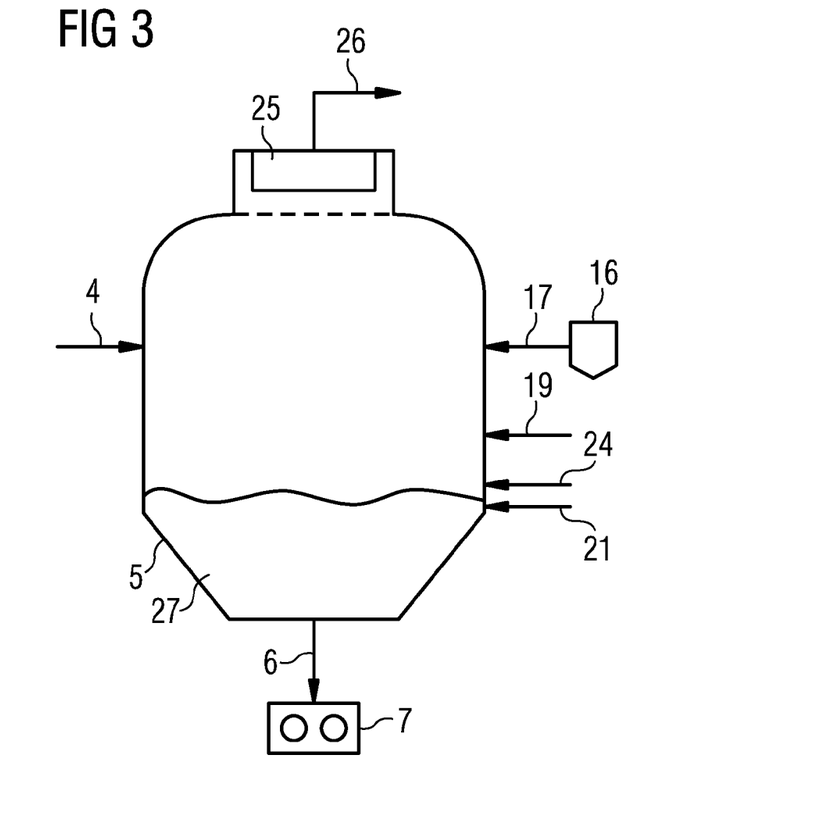
FIG. 3 shows a schematic longitudinal section through the example collection tank 5 shown in FIG. 1.

FIG. 3 shows a schematic longitudinal section through the collection tank 5 shown in FIG. 1 together with system parts connected thereto, which for reasons of clarity were not all shown in FIG. 1. The finely particulate direct reduced iron (DRI) produced in the series of fluidized bed reactors is transferred from the fluidized bed reactor 3d shown in FIG. 1 into the collection tank 5 via the pneumatically operated transfer line 4. The finely particulate direct reduced iron (DRI) is fed from the collection tank 5 via a feed line 6 to a compacting system 7 for compacting finely particulate material. The dust feed line 17 for feeding dry dust containing iron oxide from the dry dedusting apparatus 16 shown in FIG. 1 issues into the collection tank 5. Vent gas is discharged from the collection tank 5 via the gas outlet 26. For the purpose of dedusting the vent gas, a dry dedusting apparatus 25 comprising ceramic filter candles is arranged within the DRI fines bunker in such a way that the dedusting is effected before the vent gas enters the gas outlet 26. Upon cleaning of the ceramic filter candles—for example by the impact of purge gas—dust separated at the ceramic filter candles falls onto the material 27 collected in the collection tank.

Thus, some embodiments provide an iron carrier which is produced by compacting apparatuses already present for compacting DRI and therefore requires minimal modifications or enhancements to systems, or no additional systems for the provision thereof. This may reduce the costs associated with the provision of the iron carriers.

A further advantage of the certain embodiments is that dry finely particulate material containing at least finely particulate iron oxide and also if appropriate finely particulate iron and carbon may be used as an iron carrier, instead of having to be fed for disposal, as has been the case to date, associated with costs and complexity.

By using the dry finely particulate material containing at least finely particulate iron oxide and also if appropriate finely particulate iron and carbon as an iron carrier, iron ore can be substituted as an iron carrier, saving raw material costs.

LIST OF REFERENCE SYMBOLS

Fluidized bed reduction system 1
Finely particulate iron ore 2
Fluidized bed reactors 3a, 3b, 3c, 3d
Transfer line 4
Collection tank 5
Feed line 6
Compacting system 7
Pressed articles 8
Reducing gas 9
Melter gasifier 10
Carbon carrier 11
Oxygen 12
Shaft reactor 13
Pig iron 14
Off-gas line 15
Dry dedusting apparatus 16
Dust feed line 17
Withdrawal line 18a, 18b, 18c, 18d
Dust feed line 19
Fine ore drying system 20

Dust feed line 21
Dedusting system 22
Material conveying apparatus 23
Dust feed line 24
Dry dedusting apparatus 25
Gas outlet 26
Material 27
Charging apparatus 28

The invention claimed is:

1. An apparatus for producing pressed articles containing a fine particulate direct reduced iron, the apparatus comprising:
    a fluidized bed reduction system comprising at least one fluidized bed reactor configured for direct reduction of fine particulate iron ore;
    a collection tank configured to receive fine particulate direct reduced iron produced, from the fine particulate iron ore, in the fluidized bed reduction system;
    a transfer line configured to transfer the fine particulate direct reduced iron produced in the fluidized bed reduction system into the collection tank;
    a compacting system configured to compact finely particulate material;
    a feed line configured to feed the fine particulate direct reduced iron from the collection tank into the compacting system;
    at least one dust feed line configured to feed dry fine particulate material containing at least the fine particulate iron oxide into at least one of (a) the collection tank configured to collect the fine particulate direct reduced iron, and (b) the feed line;
    an off-gas line for discharging off-gas extending from at least one fluidized bed reactor in the fluidized bed reduction system; and
    a dry dedusting apparatus for the stream of gas guided in the off-gas line, the dry dedusting apparatus arranged in the off-gas line,
    wherein the at least one dust feed line extends from the dry dedusting apparatus.

2. An apparatus for producing pressed articles containing a fine particulate direct reduced iron, the apparatus comprising:
    a fluidized bed reduction system comprising at least one fluidized bed reactor configured for direct reduction of fine particulate iron ore;
    a collection tank configured to receive fine particulate direct reduced iron produced, from the fine particulate iron ore, in the fluidized bed reduction system;
    a transfer line configured to transfer the fine particulate direct reduced iron produced in the fluidized bed reduction system into the collection tank;
    a compacting system configured to compact finely particulate material;
    a feed line configured to feed the fine particulate direct reduced iron from the collection tank into the compacting system;
    at least one dust feed line configured to feed dry fine particulate material containing at least the fine particulate iron oxide into at least one of (a) the collection tank configured to collect the fine particulate direct reduced iron, and (b) the feed line; and
    at least one withdrawal line extending from each fluidized bed reactor in the fluidized bed reduction system and configured to withdraw fine particulate direct reduced material present in the respective fluidized bed reactor,
    wherein the at least one dust feed line originates in the at least one withdrawal line.

3. The apparatus of claim 1, comprising:
    at least one withdrawal line extending from each fluidized bed reactor in the fluidized bed reduction system and configured to withdraw fine particulate direct reduced material present in the respective fluidized bed reactor,
    wherein the at least one dust feed line originates in the at least one withdrawal line.

4. The apparatus of claim 1, comprising:
    a dust feed line that is positioned and configured to issue into at least one of the collection tank and the feed line,
    wherein the dust feed line proceeds from a fine ore drying system and receives fine ore from the fluidized bed reduction system in a system assembly.

5. The apparatus of claim 1, comprising a deduster device dust feed line that issues into at least one of the collection tank and the feed line, the dust feed line positioned and configured to lead from a dedusting device of a material conveying apparatus assigned to the fluidized bed reduction system in a system assembly.

6. The apparatus of claim 3, wherein the withdrawal line extending from each fluidized bed reactors in the fluidized bed reduction system is configured to withdraw finely particulate direct reduced material present in the respective fluidized bed reactor before shutdown of the fluidized bed reduction system.

7. The apparatus of claim 1, wherein the at least one dust feed line is configured to feed fine particulate iron and carbon issue into the at least one of (a) the collection tank configured to collect fine particulate direct reduced iron and (b) the feed line.

8. The apparatus of claim 2, comprising:
    an off-gas line for discharging off-gas extending from at least one fluidized bed reactor in the fluidized bed reduction system; and
    a dry dedusting apparatus for the stream of gas guided in the off-gas line, the dry dedusting apparatus arranged in the off-gas line,
    wherein the at least one dust feed line extends from the dry dedusting apparatus.

9. The apparatus of claim 2, comprising:
    a dust feed line positioned and configured to issue into at least one of the collection tank and the feed line,
    wherein the dust feed line proceeds from a fine ore drying system and receives fine ore from the fluidized bed reduction system in a system assembly.

10. An apparatus for producing pressed articles containing a fine particulate direct reduced iron, the apparatus comprising:
    a fluidized bed reduction system comprising at least one fluidized bed reactor configured for direct reduction of fine particulate iron ore;
    a collection tank configured to receive fine particulate direct reduced iron produced, from the fine particulate iron ore, in the fluidized bed reduction system;
    a transfer line configured to transfer the fine particulate direct reduced iron produced in the fluidized bed reduction system into the collection tank;
    a compacting system configured to compact finely particulate material;
    a feed line configured to feed the fine particulate direct reduced iron from the collection tank into the compacting system;
    at least one dust feed line configured to feed dry fine particulate material containing at least the fine particulate iron oxide into at least one of (a) the collection tank configured to collect the fine particulate direct reduced iron, and (b) the feed line; and a dust feed line that is positioned and configured to issue into at least one of the collection tank and the feed line, wherein the dust feed line proceeds from a fine ore drying system and receives fine ore from the fluidized bed reduction system in a system assembly.

\* \* \* \* \*